July 8, 1952 J. A. HENNE 2,602,384
PHOTOGRAPHIC SHUTTER WITH BUILT-IN SYNCHRONIZER
Filed April 3, 1948 4 Sheets-Sheet 1
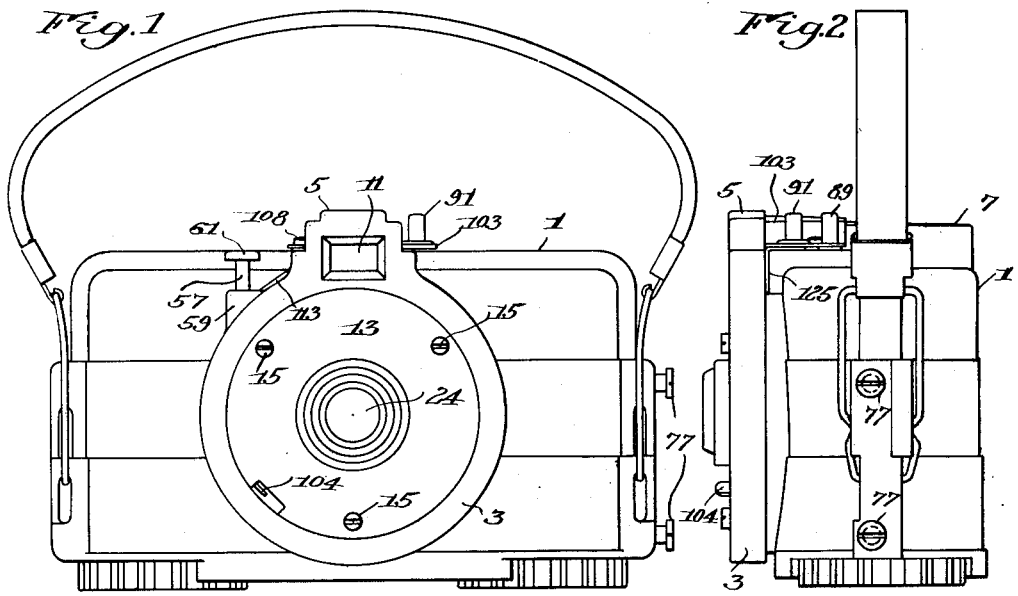
INVENTOR.
Julius A. Henne
BY Charles Shepard
his Attorney

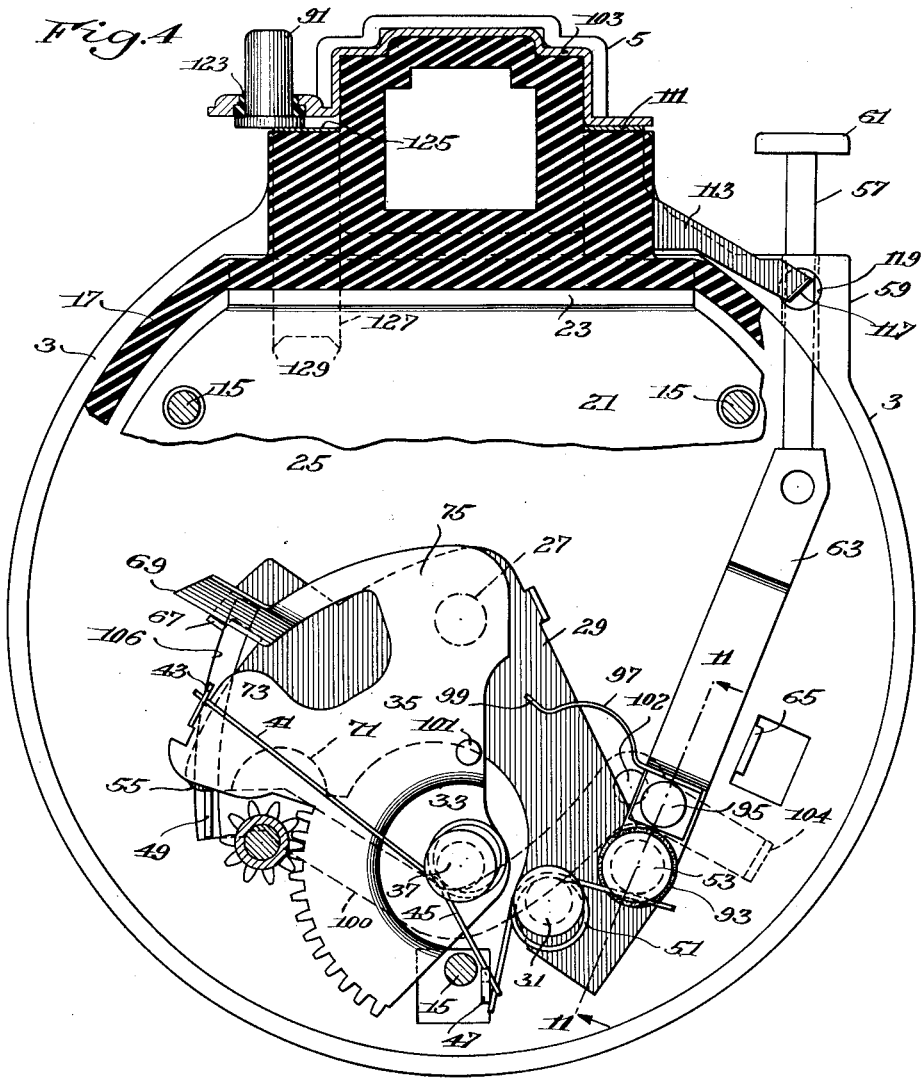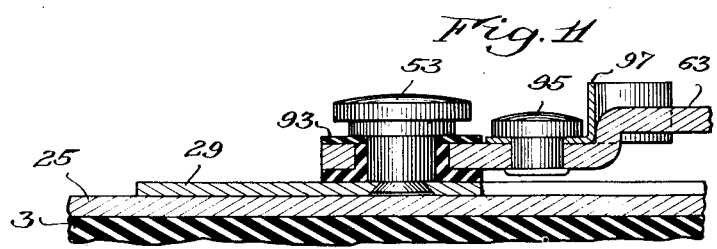

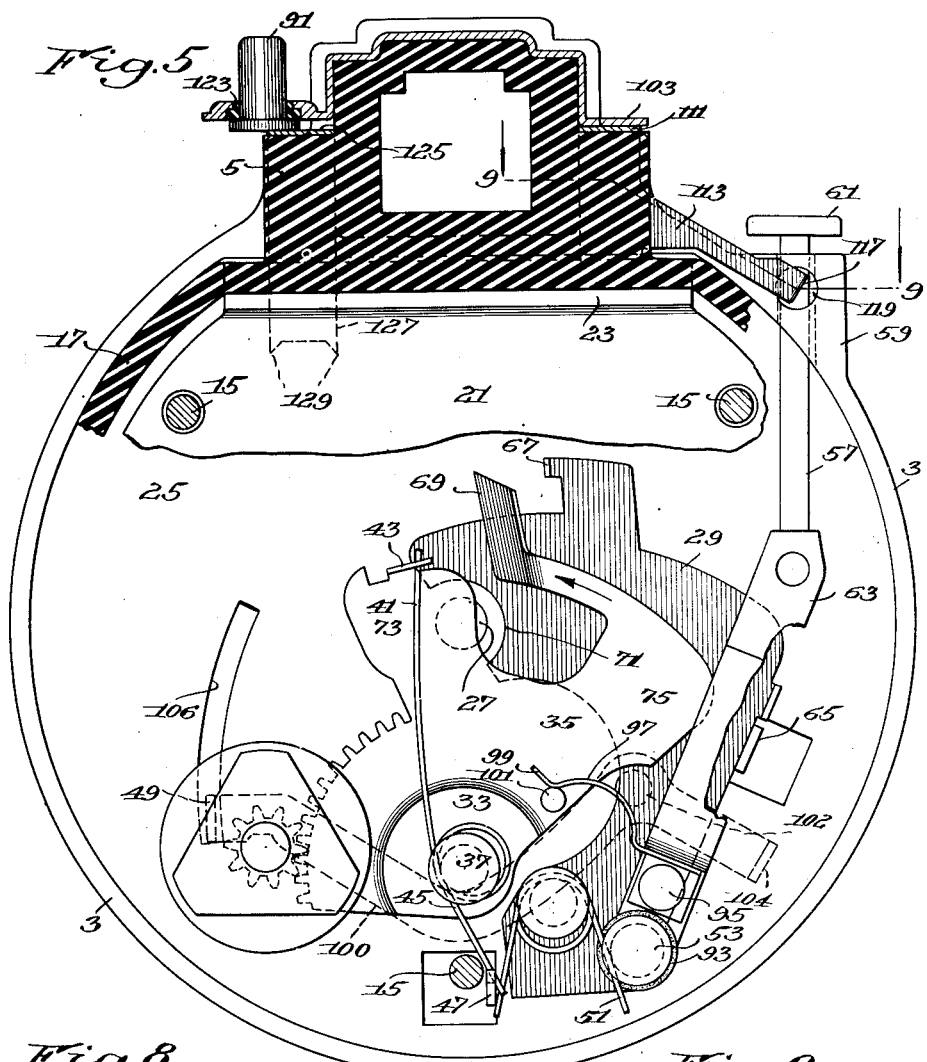

July 8, 1952 J. A. HENNE 2,602,384
PHOTOGRAPHIC SHUTTER WITH BUILT-IN SYNCHRONIZER
Filed April 3, 1948 4 Sheets-Sheet 4
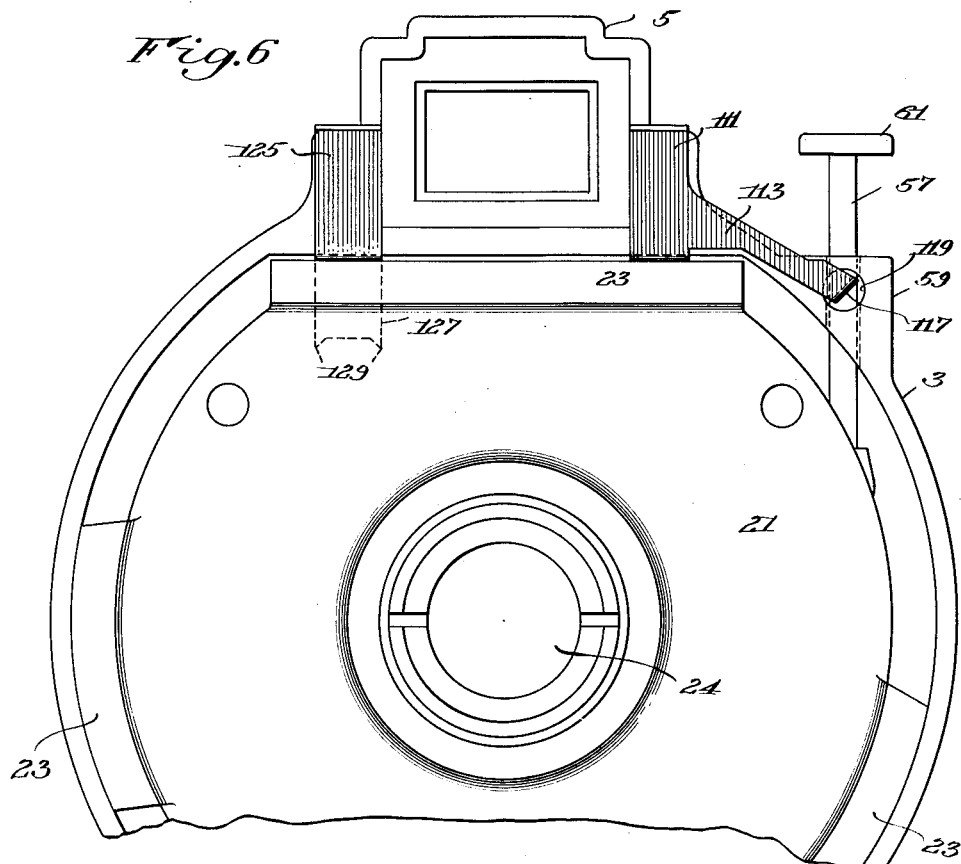
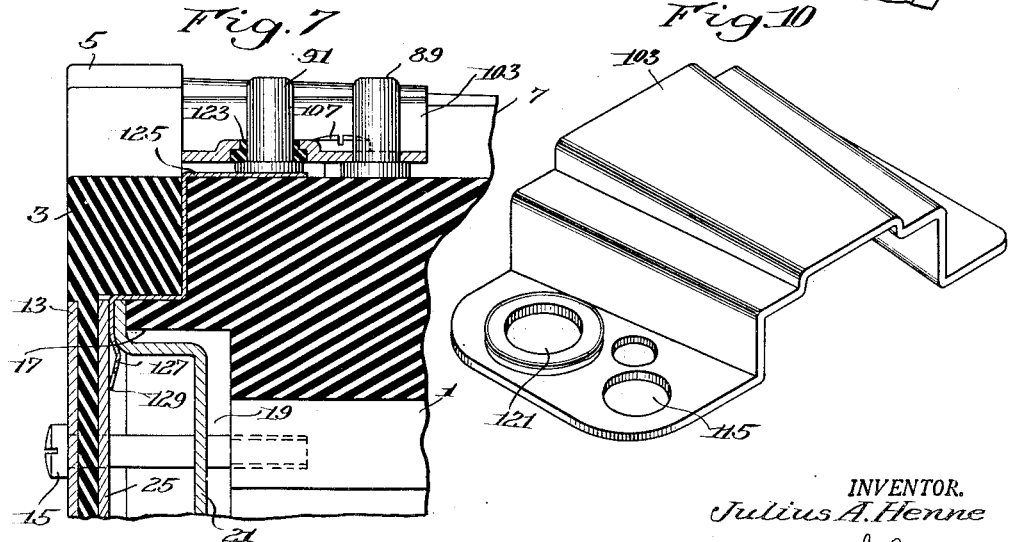
INVENTOR.
Julius A. Henne
BY Charles Shepard
His Attorney Patented July 8, 1952

2,602,384

UNITED STATES PATENT OFFICE 2,602,384

PHOTOGRAPHIC SHUTTER WITH BUILT-IN SYNCHRONIZER

Julius A. Henne, Rochester, N. Y., assignor, by mesne assignments, to Claude G. Wright, Webster, James P. Wilmot, Rochester, and James W. Morrisey, Wellsburg, N. Y.

Application April 3, 1948, Serial No. 18,826

10 Claims. (Cl. 95—11.5)

This invention relates to photography and more particularly to photographic cameras and shutters therefor of the type equipped to synchronize the exposure period, however brief, with the ignition of a flash source or other electrically motivated device used as an adjunct to illuminate the photographic subject. It has for its general object to provide a simple, efficient, and easily assembled and regulated mechanism and structure of this nature and, further, one signally applicable in practice to pivoted blade shutters of the simpler and less expensive type. The improvements are directed in part toward a novel electric circuit arrangement from shutter to flash bulb that is worked into the necessary major elements of the camera and shutter casing with very little modifications thereof or additions thereto.

These and other desirable objects are accomplished by the construction disclosed as an illustrative embodiment of the invention in the following description and in the accompanying drawings forming a part hereof, in which:

Fig. 1 is a front view of a hand camera and shutter constructed in accordance with and illustrating one embodiment of the invention;

Fig. 2 is a side view thereof;

Fig. 3 is an enlarged, fragmentary top plan view of the camera body showing that of the shutter casing and finder housing as well, together with a diagrammatic showing of electrical circuit connections to a flash bulb;

Fig. 4 is an enlarged rear view of the shutter and its casing, the former with its moving parts in normal closed positions and the latter partly in transverse section through the finder housing and certain electrical connections, the rear cover and lens plate being broken away;

Fig. 5 is a similar view but with the moving parts of the shutter shown in process of making an exposure;

Fig. 6 is an enlarged fragmentary rear view of the shutter casing with the rear cover and lens plate in place;

Fig. 7 is an enlarged fragmentary vertical longitudinal section through the camera body and shutter casing showing certain electrical terminal and related connections, the section being taken substantially on the line 7—7 of Fig. 3;

Fig. 8 is a similar view taken substantially on the line 8—8 of Fig. 3;

Fig. 9 is a fragmentary enlarged top plan view of the camera body and shutter casing partly in broken section on the line 9—9 of Fig. 5 to reveal a certain electrical connection;

Fig. 10 is a perspective view of an electric conducting plate built into the finder housing, and Fig. 11 is an enlarged fragmentary section through the operating member of the shutter mechanism taken substantially on the line 11—11 of Fig. 4.

The same reference numerals throughout the several views indicate the same parts.

It is first explained that, in the present embodiment of the invention, and as a part of one of its features, the major portions of the camera body, the shutter casing, and the finder housing are composed of molded plastic products or similar material which is inherently a natural electrical insulator. Advantage has been taken of this fact in simplifying electrical connections as previously mentioned, and it should be borne in mind throughout the ensuing descriptions.

Referring now more particularly to the drawings and first to Figs. 1, 2, and 3 thereof, I indicates the camera body, 3 the shutter casing with lens opening, and 5 the forward portion of a finder housing, the forepart of which is made integral with the shutter casing to carry the image lens 11, the rear portion 7 of such housing carrying the eye piece and being fixed to the body 1. An annular finishing plate 13 is set into the front of the shutter casing 3 and pierced by screws 15 which also serve to fasten the shutter casing, through a separate unit, to the front of the camera body 1. The latter is provided with an integral annular ridge 17 (see also Figs. 5 and 7) over which the similar side walls of the shutter casing 3 telescope. This leaves a circular cavity 19 in the camera body that accommodates a rearwardly offset lens plate 21 (the actual camera "front") having forward flanged lugs 23 (Fig. 6) that fit in notches in the body annulus 17 (see Fig. 5). This plate 21 carries the lens 24. Between the body annulus 17 and the flanged lugs 23, on the one hand, and the front wall of the shutter casing 3 on the other hand, lies the substantially circular base or mounting plate 25 of the shutter. It lies flat against said wall and all these parts are clamped together by means of the aforesaid screws 15, making a simple and fast manner of assembly.

As shown in Figs. 4 and 5, all the shutter mechanism is mounted on the rear face of the metallic base plate 25 which has a central exposure opening 27 in the optical axis of the lens 24. This opening is normally closed by a cover blind 29 pivoted on a headed stud 31. Overlying the cover blind and clearing it comfortably by reason of its having a depressed hub 33 bearing against the base plate 25, is a shutter blade 35 pivoted on a fixed headed stud 37 on which is also mounted a motivating spring. A long arm 41 of this spring engages an ear 43 on the far swinging edge of the blade while the other end 45 reacts against a fixed ear 47 on the base plate. The tendency of this spring is to move the blade counterclockwise (in the figures) and normally hold it at rest against a stop 49. Similarly, a spring 51 on the fixed pivot stud 37 of the cover blind 29 reacts against the same fixed ear 47 and on the cover blind to urge it also in a counterclockwise direction until halted by an edge 55 thereon striking stop 49. The toothed segment seen on the forward edge of the blade and the pinion meshing therewith are components of a retarding device for timing automatic exposures and not important to the present invention.

The shutter operating member comprises a plunger rod 57 guided in a bore in a lug 59 on the casing 3 and terminating at the top in an exterior push button 61. A rigid extension 63 on its lower end is connected pivotally to the stud 53 on the cover blind 29 as a wrist pin. It will be seen, therefore, that for an instantaneous or automatically timed exposure, when button 61 is depressed, the cover blind 29 will be retracted or swung to the right against a stop 65 on the base plate as in Fig. 5, which stop thereby limits the stroke of the operating member. While both the shutter and cover blind continue to close the lens opening 27, the cover blind carries the blade with it against the action of the latter's spring by virtue of an upstanding latch 67 on an extension of the cover blind which is in engagement with a spring finger 69 on a similar extension of the blade 35. But (Fig. 5) as the cover blind and blade are turning on different centers, just after the cut-out portion 71 of the former uncovers the lens opening 27, the latch 67 slips off the end of the finger 69, to swing back in a counterclockwise direction under the influence of its motor spring 51. Thereupon the portion 73 of the blade, which has been covering the exposure opening 27, opens it for exposure and then closes it again immediately with its portion 75 as the spring arm 41 drives the blade back to its stop 49. Fig. 5 shows the initial point or beginning of the actual exposure. The duration of the exposure lasts from the time that the portion 73 of the blade uncovers the exposure opening 27, until the time that the portion 75 of the blade covers and closes the opening 27. When the pressure on the operating button 61 is released, the operating member and the cover blind 29 are both returned to the inoperative or normal rest position of Fig. 4.

The mechanism resets itself by reason of the fact that the spring finger 69 on the blade is inclined to present a rearward cam face on its underside, so that as the cover blind later returns to normal position, the latch 67 will ride under it and displace it until the latch reengages its forward edge as in Fig. 4.

The flash bulb or related electrical illuminant for the object of the exposure may be of any desired nature or disposition but for the purpose of the illustrated embodiment of the invention it will be assumed that it is a separate unit attachable to the camera body 1 by means of the headed posts 77 thereon (Figs. 1 and 2). A flash bulb component thereof is shown at 79 in Fig. 3 with a diagrammatic connection, only, with the camera including a battery 81, a lead in wire 83 therefrom, a lead out wire 85 and a return wire 87. The last two mentioned wires will be assumed to be electrically connected respectively by a suitable jack with two terminal posts 89 and 91 on the self insulating camera body, or, more particularly on the portion 7 of the finder housing. The rest of the circuit through the shutter mechanism will now be described but from the other end, that is, beginning with the shutter function of closing the circuit to flash the bulb at the exact instant that is best or desirable with reference to the opening of the lens.

The mounting plate 25 is utilized in the circuit as a secondary ground. Hence the metallic shutter blade 35 is grounded as well as contiguous parts. The operating member 61—63, however, is on the other side of the circuit because (Fig. 11) the stud 53 by which it is pivoted to the cover blind 29 is fitted with an insulating bushing 93 on which it has its wrist pin pivotal bearing. Just above this bearing there is riveted to the operating member extension 63 at 95 a laterally projecting resilient wiper arm 97 of arched form, as shown, terminating in a brief brush surface or wiping contact surface 99. The wiper is of such conformation and so disposed as to angularity that when, on actuation, the operating member by which it is carried is depressed, it will move into the path of an electrically connected pin contact 101 on the shutter blade 35. As the shutter blade 35 is retracted for an exposure by the downward stroke of the operating member, the part 99 of the wiper will be out of the path of the contact pin 101; for the pin 101 moves to the right, beyond the part 99, before the latter comes down far enough to intersect the path of swinging movement of the pin. But by the time that the shutter blade 35 reaches its rightward position (viewed from the rear as in Figs. 4 and 5) and is released from the ear 67 so it may swing leftwardly, the contact member 97 has come down (with the member 63) far enough so that the part 99 lies in the path of swinging movement of the pin 101, and it will be engaged by the pin to make the electric contact at this point as the blade swings leftwardly to make the exposure. The electric contact is a wiping contact, produced by the pin 101 sliding or brushing over the lower surface of the part 99 of the resilient arm 97 and slightly displacing the arm upwardly as the pin moves along it. Such a contact is particularly advantageous and desirable in that the contacting parts automatically keep themselves clean, thus producing a reliable circuit-closing device, and also the switch parts 99 and 101 remain in contact with each other long enough to permit sufficient flow of current to insure lighting of the flash bulb 79. After the pin 101 has swung leftwardly beyond the contact part 99, the latter is retracted upwardly again along with the return movement of the operating member 63, when the finger pressure on the button 61 is released.

The exact synchronization or timing of the making of the electric contact with respect to the optical exposure may be varied for calibration purposes by bending the arm 97 in one direction or the other. As above indicated, the contact arm 97 is of resilient material (being made, for example, of Phosphor bronze) and retains its springiness under conditions of normal use. But by purposely bending the arm one way or the other enough to strain it beyond its elastic limit, its normal or undisplaced shape may be varied enough for calibration, if necessary.

The shutter is preferably set to operate at an exposure speed of about 1/30 to 1/35 of a second. Such an exposure has a duration of about 29 to 33 milliseconds, of course. If the electric switch 99, 101 is timed to make contact just about the time that the shutter blade part 73 is beginning to open or uncover the exposure opening 27, the shutter may be used successfully with photoflash bulbs of all the usual kinds now commonly available on the market. Such photoflash bulbs have varying time-lag characteristics, as is well understood in the art, between the limits of about 5 milliseconds for the fast bulbs to about 20 milliseconds for the slow bulbs, this time-lag being the time required for the illumination flash to reach its peak of maximum brilliance or intensity, after the electric circuit through the bulb is closed. So it is seen that if the circuit is closed (by contact of the parts 99 and 101) just as the shutter begins to open, and if the exposure has the above indicated duration of about 29 to 33 milliseconds, then whether the photoflash bulb has a time-lag of 5 milliseconds or a time-lag of 20 milliseconds the maximum brilliance of the flash will in either case occur while the shutter is fully open or substantially fully open, so that good photographic results are assured in either event.

While on the subject of timing, it may be explained that the synchronizer of the present invention is also capable of use, if desired, with "time" exposures as distinguished from "instantaneous" exposures of the kind above mentioned. To provide for time exposures, the shutter has a control lever 100 (Figs. 4 and 5) pivoted at 102 on the front face of the plate 25, that is, the face opposite to that on which the shutter blade 35 is mounted. One end of this lever 100 is bent forwardly to provide an ear 104 which extends forwardly through a slot in the front wall of the shutter casing and a slot in the front plate 13, to an accessible position for manipulation by the operator. The other end of this lever 100 is bent rearwardly to provide an ear which is the stop member 49 above mentioned, this ear extending through an arcuate slot 106 in the plate 25, concentric with the pivot 102.

For ordinary "instantaneous" or automatically timed exposures, the lever 100 and its ears 104 and 49 are in the positions shown in Figs. 1, 4, and 5, and the parts operate as above described. For a "time" exposure, however, the operator moves the accessible ear 104 downwardly, which swings the lever 100 to move the stop member 49 upwardly along the slot 106, from the bottom thereof to the top thereof. In this latter position, the stop 49 will come in contact with the left edge of the part 73 of the shutter blade at an earlier time in the swinging movement of the blade, and will hold it in a fully open position, preventing it from swinging far enough to let the portion 75 cover and close the exposure opening 27. Thus when the finger piece 61 and the plunger 57 are depressed, the cover blind 29 uncovers the exposure opening or aperture 27 just as before, and then releases the shutter blade 35, but the latter, instead of opening and quickly closing the exposure aperture, leaves it open by reason of engagement with the stop member 49. Then the exposure is terminated by release of finger pressure on the member 61, which permits the spring 51 to swing the cover blind 29 to cover the aperture. But it will be seen from this description of a time exposure operation that in such an exposure there is no change in or interference with the functioning of the electric switch parts 99 and 101. In a time exposure, just as in an instantaneous exposure, the parts 99 and 101 come into wiping contact with each other and complete the electrical circuit at this point just as the shutter begins to open the exposure aperture, so that the shutter will be fully or substantially fully open by the time the photoflash bulb reaches its peak of maximum brilliance.

Returning now to the remainder of the electrical flash bulb circuit between these making and breaking contacts on the shutter members and the jack receiving terminals 89 and 91 earlier described, terminal 89 extends through an opening 115 (Fig. 10) in and is in electrical contact with a lateral flange of a metal plate 103 (Figs. 4, 7, and 10) fastened on the top of finder housing 7 by means of screws 107 and 108 on opposite sides thereof, and conforming to the contour of the housing. Under the screw 108 and under that side of the plate 103 which is remote from the prongs or terminals 89 and 91, is a metallic conductor strip 111 (Figs. 4, 6, and 8) that continues downwardly between the body casing 1 and shutter casing 3—5 (Fig. 8), thence laterally beneath the top wall of the shutter casing to emerge at the right side in the form of a spring arm 113. A forwardly bent tip 117 at the extremity of this spring arm passes through a free opening 119 (Fig. 9) in the bearing lug 59 of the operating member 57 and makes continuous sliding contact with the latter. The current may flow thence along the members 57 and 63 to and along the resilient contact arm 97, 99, but no farther because of the insulating bushing 93.

The other terminal post 91 (Figs. 5, 6, and 7) passes through another opening 121 in the conductor plate 103 but is insulated therefrom by a bushing 123. In contact with its bottom is a metallic conductor strip 125 which proceeds forwardly on the left side of the camera, thence downwardly and forwardly between the body 1 and shutter casing 3, and terminates in a spring finger 127 resiliently clamped between the flange 23 of the lens carrying plate 21 and the shutter base plate 25, making electrical contact with both of them and being, in effect, grounded on the plate 25, to which the shutter blade 35 and shutter contact pin 101 are likewise grounded. The thickness of the head or bottom flange on the post or stud 91 adequately spaces the plate 103 from the conductor strip 125 and prevents direct electrical contact between them, as seen in Figs. 4 and 5. The lower end of the member 127 has sharp corners 129 which tend to dig into the face of the plate 25 and thus make a better electrical contact therewith.

It will be seen that, as far as the exposure mechanism of this simple shutter is concerned, the circuit arrangements require only the addition of pin 101 to the shutter blade 35 and the addition of the wiper or contact arm 97 to the operating member 63, and the placing of the insulation 93 on the stud 53. These are all minor changes which may be made at modest expense without any major redesign of the tools and dies required for making the same shutter in its original form, without the electric circuit. When the shutter casing is removed from the camera, the contact arm 97 is open and accessible for fine, bendable adjustment to make the precise contact desired for calibrating the timing of the synchronizer.

As to establishing the rest of the electrical circuit it will be observed that it is entirely concealed except for the terminal connections 89 and 91, and the plate 103 which is of unobjectionable appearance, and a small portion of the arm 113. No wires are used, the conducting elements simply intervening between necessary camera parts and being adapted to be easily and quickly assembled therewith by mere super-positioning in putting the structure together.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. In photography, an electric circuit controlling lens shutter embodying in combination a casing of insulating material, an electrical conducting base plate therein having an exposure aperture, a pivoted shutter blade on the base in electrical contact therewith and provided with an electrical contact pin, an operating member for the blade guided in the casing for approximately rectilinear movement and provided with a resilient contact wiper arm normally spaced from but adapted to close and brush with the pin when the blade is actuated, operating connections including an electrically insulated pivoted stud between the operating member and the blade for operating the latter from movement of the former, and circuit connections to the base plate and the operating member, respectively.

2. A shutter constructed in accordance with claim 1 in which the circuit connection to the operating member includes a spring finger mounted on the casing and riding slidably on the operating member.

3. In photography, an electric circuit controlling lens shutter embodying in combination, a camera body having a two part view finder housing thereon and a forward separate shutter casing carrying the front portion of the said housing, all of said parts being of insulating material, an electrically conducting base plate in the shutter casing, a shutter blade movable in the base plate and provided with an electrical contact in circuit with the base plate, a conducting operating member for the blade insulated from the latter and guided in the shutter casing on one side of the finder housing to move relatively to the blade and provided with an electrical contact member normally open but adapted to close with that on the blade when the latter is actuated, an electric circuit having two terminal connections on the other side of the finder housing, and conductor strips extending between the first mentioned insulating parts and connecting one terminal to the base plate and the other to the operating member.

4. In a photographic shutter of the type including a metal member having an exposure aperture therein, a cover blind pivotally mounted at one point on said metal member to swing between obscuring and non-obscuring positions relative to said aperture, a shutter blade pivotally mounted at another point on said metal member to swing through a non-obscuring position between two obscuring positions relative to said aperture, an operating member connected to said cover blind and movable in one direction to shift said cover blind from an obscuring position to a non-obscuring position relative to said aperture, and a connection between said cover blind and said shutter blade effective to move the latter by movement of the former when said operating member is moved in said one direction and then to release said blade for return movement from an obscuring position through a non-obscuring position to another obscuring position; the combination of a first electric contact member on said shutter blade to swing therewith in a predetermined arc, a second electric contact member on said operating member and lying out of the path of said arc during the early part of the movement of said operating member in said one direction and being carried by movement of said operating member into said arc during the latter part of the movement of said operating member so that said first contact member will hit against and make contact with said second contact member as said shutter blade swings through its return movement, and electric circuit connections from said first and second contact members to control the operation of electric illuminating means in synchronism with operation of said shutter blade.

5. A construction as described in claim 4, in which said first contact member is electrically connected to said shutter blade and said blade is of conducting material and is electrically connected to said metal member, and in which said second contact member is electrically connected to said operating member and said operating member is of conducting material and is electrically insulated from said shutter blade and metal member.

6. A construction as described in claim 5, in which said electric circuit connections further include a pair of externally accessible prongs adapted to be detachably connected to an electric flash bulb socket, a metal strip electrically connected to one of said prongs and having a portion bearing resiliently against said operating member to maintain sliding electric contact therewith during movement of said operating member, and a second metal strip electrically connected to the other of said prongs and having a portion clamped tightly against said metal member to maintain electric contact therewith.

7. A construction as described in claim 6, in which the portion of said second metal strip which is clamped against said metal member has a sharp angular end tending to dig into said metal member to make good electric contact therewith.

8. A flash-synchronizing photographic shutter comprising blade mechanism including a blade mounted to swing in one direction preparatory to opening the shutter and to swing in a reverse direction to open the shutter to make an exposure, an operating member mounted for movement back and forth, movement of said operating member in one direction being effective to swing said blade in said preparatory direction and then to release said blade for swinging in said reverse direction, said blade and said operating member being normally electrically insulated from each other, a first electric contact member mounted on said blade to swing bodily therewith, and a second electric contact member mounted on said operating member to move bodily therewith, said second contact member being so placed on said operating member that said second contact member will be out of the path of travel of said first contact member when said blade swings in said preparatory direction and will, by movement of said operating member, be brought to a position in the path of travel of said first contact member to make electric contact therewith when said blade swings in said reverse direction.

9. In photography, an electric circuit controlling lens shutter of the blade and cover blind type embodying, in combination, a base having a lens opening, a movable shutter blade thereon having setting and opening movements in reverse directions with relation to the lens opening and provided with an electrical contact, an operating member for the blade movable relatively thereto transversely to the path of movement of the contact thereon and provided with an arched spring arm terminating in an electrical contact member normally open but adapted to close with that on the blade when the latter is actuated, said arm and contact member on the operating member being fixed to and bodily supported by and movable bodily with said operating member and the arm contact being in such position as to be out of the path of travel of the contact on the blade during said setting movement of the blade in which period the blade contact is received out of contact within the arch of the arm and the arm contact being in the path of travel of the contact on the blade during reverse opening movement of the blade, and circuit connections to the respective contacts.

10. In photography, an electric circuit controlling lens shutter embodying in combination, a base having a lens opening, a first movable shutter blade thereon provided with an electrical contact pin and having relatively reverse setting and opening movements, a second movable blade operatively connected to the first blade to drive the latter in one direction for its setting movement and then to release the first blade for its opening movement in the opposite direction, an operating member for the second blade movable relatively thereto transversely to the path of the blade contact pin, a bendably adjustable but resilient arched contact arm mounted on said operating member and terminating in a contact member normally spaced from said contact pin but adapted to close and brush with the pin on the first blade during the latter's opening movement said pin being received out of contact within the arch of the arm during setting movement of the blade, and circuit connections to the respective contacts.

JULIUS A. HENNE.

REFERENCES CITED

The following references are of record in the file of this patent:

UNITED STATES PATENTS

| Number | Name | Date |
| --- | --- | --- |
| 2,196,604 | Galter | Apr. 9, 1940 |
| 2,198,975 | Pollock | Apr. 30, 1940 |
| 2,256,354 | Riddell | Sept. 16, 1941 |
| 2,282,850 | Brownscombe | May 12, 1942 |
| 2,286,808 | Hutchison, Jr. | June 16, 1942 |
| 2,317,465 | Kende et al. | Apr. 27, 1943 |